United States Patent
Chang (10) Patent No.: US 9,392,264 B1
(45) Date of Patent: Jul. 12, 2016

(54) OCCLUDED OBJECT RECOGNITION

(71) Applicant: Amazon Technologies, Inc., Reno, NV (US)

(72) Inventor: Samuel Henry Chang, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 791 days.

(21) Appl. No.: 13/650,597

(22) Filed: Oct. 12, 2012

(51) Int. Cl.
*H04N 13/00* (2006.01)
*H04N 13/02* (2006.01)

(52) U.S. Cl.
CPC .................................. *H04N 13/0282* (2013.01)

(58) Field of Classification Search
None
See application file for complete search history.

(56) References Cited

U.S. PATENT DOCUMENTS

| | | | | |
|---|---|---|---|---|
| 2002/0041327 A1* | 4/2002 | Hildreth | .................. | G06F 3/011 348/42 |
| 2002/0064382 A1* | 5/2002 | Hildreth | ............. | G06K 9/00375 396/100 |
| 2011/0025825 A1* | 2/2011 | McNamer | .......... | H04N 13/0221 348/46 |
| 2012/0051588 A1* | 3/2012 | McEldowney | ......... | G03B 17/54 382/103 |
| 2012/0223885 A1* | 9/2012 | Perez | ..................... | G06F 3/011 345/158 |

FOREIGN PATENT DOCUMENTS

WO    WO2011088053 A2    7/2011

OTHER PUBLICATIONS

Pinhanez, "The Everywhere Displays Projector: A Device to Create Ubiquitous Graphical Interfaces", IBM Thomas Watson Research Center, Ubicomp 2001, Sep. 30-Oct. 2, 2001, 18 pages.

* cited by examiner

*Primary Examiner* — Andy Rao
*Assistant Examiner* — Tyler Edwards
(74) *Attorney, Agent, or Firm* — Lee & Hayes, PLLC (57) ABSTRACT

An object observable in various images of an environment is recognized as being the same object, even when partially occluded in some images. In one particular implementation, the object is a hand which may be used for gesture input to an augmented reality system. A flexible similarity measurement metric is computed to aid in determining whether hands captured through 2D images of the environment are the same or different, regardless of whether the hands are fully observed or partially occluded. The similarity measurement metric accommodates for translation, rotation, and scaling of the hand to enable recognition of a common hand through a sequence of images even if that hand is partially occluded in some images.

17 Claims, 8 Drawing Sheets

OCCLUDED OBJECT RECOGNITION

BACKGROUND

User interfaces have traditionally relied on input devices such as keyboards, which require physical manipulation by a user. Increasingly, however, it is desired to detect and monitor the physical positions and movements of users within a scene or environment. User motions and gestures can be used in some environments as user commands and inputs to automated systems. In particular, hand gestures may be useful in providing input from a user to a computerized system.

One challenge with recognizing motions and gestures, such as hand gestures, is that part of the hand may be occluded during observation. Accordingly, there is a need to improve ways to recognize objects, such as hands when detecting gestures, which might be at least partially occluded.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

DETAILED DESCRIPTION

Described herein are systems and techniques for recognizing objects, even when partially occluded, within an environment. In one particular implementation, the object is a hand and the techniques provide for a flexible similarity measurement metric that accommodates translation, rotation, and scaling of the hand to recognize the hand when partially occluded. Multiple images of the hand may be captured while the user is making gestures within the environment. The techniques described below allow for flexible recognition of a common hand in those images, even when the hand is partially occluded in certain images.

In one implementation, a hand motion or gesture may be represented by a dynamic motion model characterized by an accompanying set of motion parameters. Observed gestures may be evaluated against a library of reference gestures by comparing their motion parameters. More specifically, a plurality of reference gestures may be observed, and motion parameters may be estimated for each of the reference gestures. Subsequently, a user may be observed making a particular gesture. Motion parameters of the user gesture may be estimated, and compared with those of the library of reference gestures to identify or classify the user gesture.

A hand motion or gesture may comprise a sequence of poses or pose vectors, where each pose vector indicates the position and orientation of the hand at a particular instance in time. The position and orientation may be specified in relative terms, such as by incremental measurements of the pose parameters with respect to previous poses in the sequence.

A library of reference gestures may be created by conducting training exercises in which people are asked to repeatedly perform particular hand gestures. Each performance of a gesture is observed to produce a corresponding motion sequence. Multiple such observed motion sequences may be averaged or otherwise combined to create a reference sequence corresponding to the gesture. The reference sequence may comprise a nominal sequence of relative pose vectors. Each reference sequence may be analyzed to estimate motion parameters that apply to a dynamic motion model. Multiple sets of motion parameters, corresponding to multiple gestures, may be stored to create a gesture library.

The model is characteristically formed using views of the entire hand, commonly showing all five fingers. However, during normal gesture interaction, the user's hand is constantly moving, thereby introducing several challenges for hand recognition. For instance, during gesture interaction, parts of the hand may be partially occluded (e.g., fingers may not be visible when bent, or when partially obscured by other fingers or another object). Additionally, the scale of the hand may vary as the user moves his hand through space. Moreover, the hand is changing rotation/orientation during the gesture movement. Each of these situations—occlusion, scale, and orientation—can make it difficult to recognize a hand during gesture movement when captured on a 2D image. Further, another consideration is to construct electronics devices used in gesture recognition at commercially viable costs, which may limit processing and memory capabilities.

The techniques described below provide a flexible similarity measurement metric that recognizes the hand (or other object) when partially occluded by comparing the metric of a non-occluded hand with the metric of the occluded hand. In one implementation, a recognition system is configured to map the curvature of the hand (or other object) onto a one dimensional (1D) curvature map and to map the distance between any two neighbor points around the boundary of a hand segment onto a 1D distance map. The distance map is used to adjust for scale between the observed partially occluded hand and the model of the non-occluded model to which it is being compared. Once normalized, the curvature map is compared to a similar curvature map formed by mapping the curvature of the non-occluded model. The maps will not be identical, since part of the observed hand is occluded, but the comparison evaluates whether there is sufficient similarity of the non-occluded parts. If the comparison results exceed an acceptable threshold, the partially occluded hand is deemed to match the non-occluded hand model.

Various types of cameras and sensors may be used to capture images representing the scene and a person's hand within the scene. In some instances, the described techniques may utilize the structured light techniques described in detail in pending U.S. patent application Ser. No. 12/977,924, filed on Dec. 23, 2010 and entitled "Characterization of a Scene with Structured Light", which is incorporated in its entirety herein by reference.

Example Environment

Figure 1:
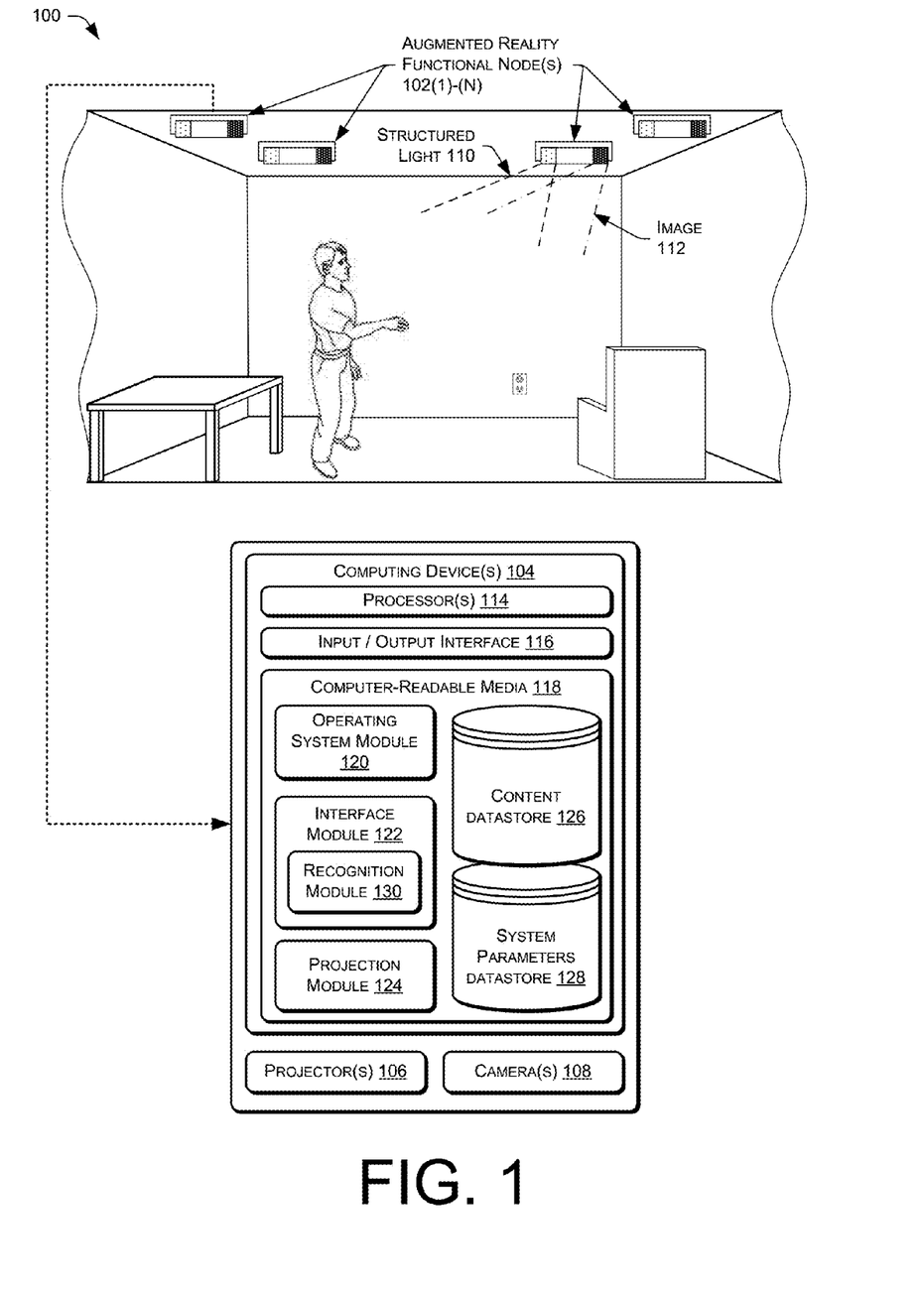
FIG. 1 illustrates an environment that includes an augmented reality functional node (ARFN) and a user that may interact with the ARFN using hand gestures.

FIG. 1 shows an illustrative augmented reality environment 100 in which the described techniques may be performed. The environment 100 includes one or more augmented reality functional nodes (ARFNs) 102(1), . . . , 102(N) (collectively referred to as "the ARFN 102" in some instances). While the environment illustrates four nodes, in some instances an environment may include any number of one or more nodes stationed in different locations throughout the environment. Furthermore, it is to be appreciated that the techniques described herein may be performed by a single ARFN, by a collection of any number of ARFNs, or by any other devices or combinations of devices having projection and imaging capabilities.

As illustrated, each ARFN 102 may include one or more computing devices 104, as well as one or more projectors 106 that, when active, project content onto any surface within the environment 100. The projected content may include electronic books, videos, images, interactive menus, or any other sort of visual content.

For instance, a user within the environment may request that the ARFN 102 project a particular electronic book that the user wishes to read. In response, the ARFN 102 may project the book onto a projection surface within the environment. In another example, the user may request that the ARFN 102 project a particular movie or show that the user wishes to watch. In response, the ARFN 102 may obtain the content (locally or remotely) and may project the content onto a surface in the environment. In yet another example, the ARFN 102 may be configured to project a user interface (UI), such as a keyboard, a slider bar, a virtual remote control to operate a television within the environment 100, or any other type of UI.

As discussed in further detail below, the ARFN 102 may include one or more cameras 108 that may capture images of the illustrated user operating the UI and, in response, the ARFN 102 may provide feedback to the user and/or may cause performance of actions corresponding to the user's selection. For instance, when the ARFN 102 projects a remote control, the ARFN 102 may provide feedback to the user indicating which button(s) a user is in position to select, may identify a user's selection (e.g., a selection to power on the television) and, in response, may operate the television according to identified selection. While a few examples have been given, it is to be appreciated that the ARFN 102 may project any other sort of content within the environment 100, including audio, video, or other content that can be perceived by user senses (e.g., aromatic content). In addition, the ARFN 102 may recognize and interpret gestures that are made by the user without reference to a UI projected within the environment.

In this example, one of the ARFNs 102 within the environment is shown to project structured light 110. In addition, the ARFN may capture one or more images 112 within the environment for the purpose of identifying distortions in the structured light 110. While FIG. 1 illustrates one ARFN projecting this structured light and imaging the environment to identify the distortions, in some implementations, one or more other ARFNs may additionally or alternatively perform these functions. In either instance, by imaging the environment in this manner, the ARFNs 102 may identify the user's gestures within the environment. Such gestures may be interpreted as instructions or commands to be implemented by the ARFNs 102.

Note that certain embodiments may not involve the projection of structured light. Accordingly, it should be understood that use of structured light is but one example of various techniques that may be used in object recognition of objects, such as a hand, in a scene.

As illustrated, the computing device 104 of the example ARFN 102 includes one or more processors 114, an input/output interface 116, and memory or computer-readable media 118. The processors 114 may be configured to execute instructions, which may be stored in the computer-readable media 118 or in other computer-readable media accessible to the processors 114.

Figure 2:
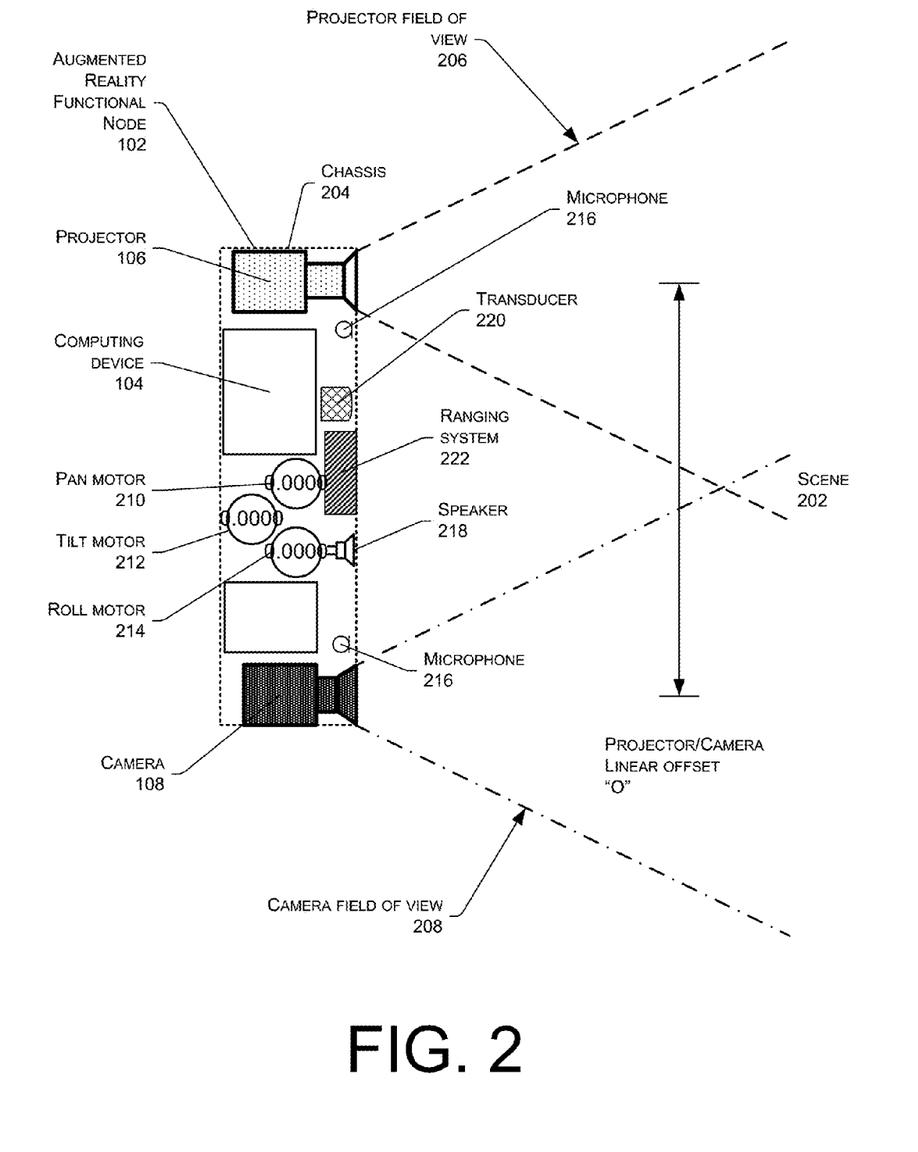
FIG. 2 illustrates an example ARFN that includes a computing device, a projector, a camera, and other selected components for allowing a user to interact with the ARFN with use of gestures interpreted by the ARFN.

The input/output interface 116, meanwhile, may be configured to couple the computing device 104 to other components of the ARFN 102, such as the projector 106, the camera 108, microphones, other ARFNs 102, other computing devices, and so forth. The coupling between the computing device 104 and the devices may be via wire, fiber optic cable, wireless connection, or the like. Furthermore, while FIG. 1 illustrates the computing device 104 as residing within a housing of the ARFN 102, some or all of the components of the computing device 104 may reside at another location that is operatively connected to the ARFN 102. In still other instances, certain components, logic, and/or the like of the computing device 104 may reside within the projector 106 or the camera 108. Therefore, it is to be appreciated that the illustration of the ARFN 102 of both FIGS. 1 and 2 is for illustrative purposes only, and that components of the ARFN 102 may be configured in any other combination and at any other location.

The computer-readable media 118, meanwhile, may include computer-readable storage media ("CRSM"). The CRSM may be any available physical media accessible by a computing device to implement the instructions stored thereon. CRSM may include, but is not limited to, random access memory ("RAM"), read-only memory ("ROM"), electrically erasable programmable read-only memory ("EEPROM"), flash memory or other memory technology, compact disk read-only memory ("CD-ROM"), digital versatile disks ("DVD") or other optical disk storage, magnetic cassettes, magnetic tape, magnetic disk storage or other magnetic storage devices, or any other medium which can be used to store the desired information and which can be accessed by a computing device 104. The computer-readable media 118 may reside within a housing of the ARFN, on one or more storage devices accessible on a local network, on cloud storage accessible via a wide area network, or in any other accessible location.

The computer-readable media 118 may store several modules, such as instructions, datastores, and so forth that are configured to execute on the processors 114. For instance, the computer-readable media 118 may store an operating system module 120, an interface module 122, a projection module 124, a content datastore 126, and a system parameters datastore 128.

The operating system module 120 may be configured to manage hardware and services within and coupled to the computing device 104 for the benefit of other modules. The interface module 122, meanwhile, may be configured to receive and interpret commands received from users within the environment 100. For instance, the interface module 122 may analyze and parse images captured by the camera 108 may include a recognition module 130 to identify hand gestures made by users within the environment 100. As will be described in more detail, the recognition module 130 implements a flexible similarity measurement metric that recognizes the user's hand even when partially occluded. The recognition module 130 compares the metrics of a non-occluded hand and a partially occluded hand, and if sufficiently similar, recognizes the hands as being the same.

In response to recognizing the hand and identifying an associated gesture, the interface module 122 may interpret the gesture and cause the ARFN 102 to perform a corresponding action. For instance, if a user within the environment 100 makes a gesture requesting that the ARFN 102 project a certain piece of content, the interface module 122 may interpret the gesture and cause the projection module 124 to project the content via the projector 106.

The content datastore 126, meanwhile, stores content for outputting within the environment. For instance, the content datastore may store applications and data for use within the environment 100. The projection module 124 may access the content datastore 126 in order to project requested content within the environment 100. For instance, when the user requests that the ARFN 102 project a particular electronic book, the projection module 124 may access the content datastore 126 to retrieve and cause projection of the desired electronic book.

Finally, the computer-readable media 118 may store the system parameters datastore 128, which is configured to maintain information about the state of the computing device 104, the projector 106, the camera 108, and so forth. For example, and as described in detail below, the ARFN 102 may be configured to pan and tilt for the purpose of allowing the projector 106 and the camera 108 to access different projection surfaces in the environment 100. As such, the system parameters maintained in the datastore 128 may include current pan and tilt settings of the camera and projector, an indication of content that the ARFN 102 is currently projecting or otherwise outputting, and the like.

The system parameter datastore 128 (or another datastore) may further store a library of reference gestures that may be used to interpret user gestures. As illustrated, the user in the room may make gestures with his body, such as hand motions, that can be captured by the cameras. The computing device identifies motion parameters corresponding to the observed gesture. The motion parameters are compared to those of the gesture library. The device then classifies the observed gesture based on the comparison.

Example ARFN

FIG. 2 shows additional details of an example ARFN 102 that may be configured to project a user interface (UI), and to identify and respond to user gestures, as described above with reference to FIG. 1. The ARFN 102 is configured to scan at least a portion of a scene 202 and the objects therein. The ARFN 102 may also be configured to provide output, such as images, sounds, and so forth.

A chassis 204 holds the components of the ARFN 102. One or more projectors 106 may be disposed within the chassis 204 and may be configured to generate and project images into the scene 202. These images may be visible light images perceptible to the user, visible light images imperceptible to the user, images with non-visible light, or a combination thereof. The projector 106 may be implemented with any number of technologies capable of generating an image and projecting that image onto a surface within the environment. Suitable technologies include a digital micromirror device (DMD), liquid crystal on silicon display (LCOS), liquid crystal display, 3LCD, and so forth. The projector 106 has a projector field of view 206 which describes a particular solid angle. The projector field of view 206 may vary according to changes in the configuration of the projector. For example, the projector field of view 206 may narrow upon application of an optical zoom to the projector.

One or more cameras 108 may also be disposed within the chassis 204. The camera 108 is configured to image the scene in visible light wavelengths, non-visible light wavelengths, or both. The camera 108 has a camera field of view 208 that describes a particular solid angle. The camera field of view 208 may vary according to changes in the configuration of the camera 108. For example, an optical zoom of the camera may narrow the camera field of view 208.

In some implementations, a plurality of cameras 108 may be used. For instance, one embodiment of the ARFN 102 may include a three-dimensional (3D), infrared (IR) camera and a red-green-blue (RGB) camera. The 3D, IR camera may be configured to capture information for detecting depths of objects within the scene 202, while the RGB camera may be configured to detect edges of objects by identifying changes in color within the scene 202. In some instances, a single camera may be configured to perform these functions.

The chassis 204 may be mounted with a fixed orientation, or may be coupled via an actuator to a fixture such that the chassis 204 may move. Actuators may include piezoelectric actuators, motors, linear actuators, and other devices configured to displace or move the chassis 204 or components therein such as the projector 106 and/or the camera 108. For example, in one implementation the actuator may comprise a pan motor 210, a tilt motor 212, a roll motor 214, and so forth. The pan motor 210 is configured to rotate the chassis 204 in a yawing motion. The tilt motor 212, meanwhile, is configured to change the pitch of the chassis 204. The roll motor 214 is configured to move the chassis 204 in a rolling motion. By panning, tilting, and/or rolling the chassis 204, different views of the scene may be acquired.

One or more microphones 216 may be disposed within the chassis 204, or elsewhere within the scene 202. These microphones 216 may be used to acquire input from the user, may be used to determine the location of a sound, or may be used to otherwise aid in the characterization of and receipt of input from the scene. For example, the user may make a particular noise, such as a tap on a wall or snap of the fingers, which are pre-designated as attention command inputs. The user may alternatively use voice commands. Such audio inputs may be located within the scene using time-of-arrival differences among the microphones and used to summon an active zone within the augmented reality environment.

One or more speakers 218 may also be present to provide for audible output. For example, the speakers 218 may be used to provide output from a text-to-speech module or to playback pre-recorded audio.

A transducer 220 may also reside within the ARFN 102, or elsewhere within the environment, and may be configured to detect and/or generate inaudible signals, such as infrasound or ultrasound. These inaudible signals may be used to provide for signaling between accessory devices and the ARFN 102.

The ARFN 102 may also include a ranging system 222. The ranging system 222 is configured to provide distance information from the ARFN 102 to a scanned object or a set of objects. The ranging system 222 may comprise radar, light detection and ranging (LIDAR), ultrasonic ranging, stereoscopic ranging, and so forth. In some implementations the transducer 220, the microphones 216, the speaker 218, or a combination thereof may be configured to use echolocation or echo-ranging to determine distance and spatial characteristics.

In this illustration, the computing device 104 is shown within the chassis 204. However, in other implementations all or a portion of the computing device 104 may be disposed in another location and coupled to the ARFN 102. This coupling may occur via wire, fiber optic cable, wirelessly, or a combination thereof. Furthermore, additional resources external to the ARFN 102 may be accessed, such as resources in another ARFN 102 accessible via a local area network, cloud resources accessible via a wide area network connection, or a combination thereof. In still other instances, the ARFN 102 may couple to and control other devices within the environment, such as televisions, stereo systems, lights, and the like.

FIG. 2 also illustrates a projector/camera linear offset designated as "O". This is a linear distance between the projector 106 and the camera 108. Placement of the projector 106 and the camera 108 at a distance "O" from one another may aid in the recovery of 3D structured light data from the scene. The known projector/camera linear offset "O" may also be used to calculate distances, dimensioning, and otherwise aid in the characterization of objects within the scene 202. In other implementations the relative angle and size of the projector field of view 206 and camera field of view 208 may vary. Also, the angle of the projector 106 and the camera 108 relative to the chassis 204 may vary.

In other implementations, the components of the ARFN 102 may be distributed in one or more locations within the environment 100. As mentioned above, microphones 216 and speakers 218 may be distributed throughout the scene. The projector 106 and the camera 108 may also be located in separate chasses 204. The ARFN 102 may also include discrete portable signaling devices used by users to issue command attention inputs. For example, these may be acoustic clickers (audible or ultrasonic), electronic signaling devices such as infrared emitters, radio transmitters, and so forth.

3D Analysis Using Structured Light Pattern

Figure 3:
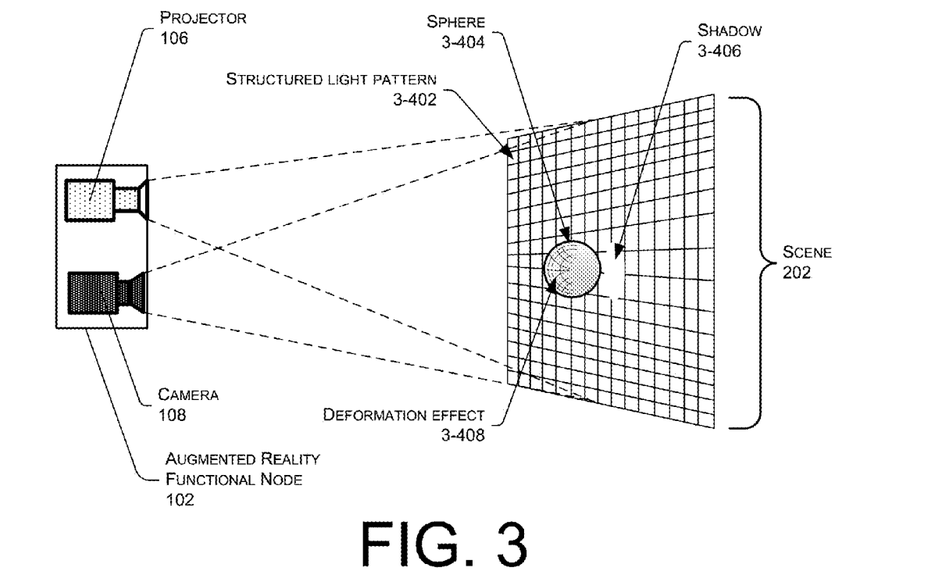
FIG. 3 is an illustrative diagram of the ARFN using structured light to identify surfaces, objects, and user interactions within an environment. By identifying user interactions, the ARFN is able to determine when a user is requesting that the ARFN perform a specified action.

FIG. 3 is an illustrative diagram of the ARFN 102 using structured light to identify 3D information regarding users, user hands, and other objects within an environment. However, while the structured light techniques described herein provide one example for obtaining 3D information regarding these objects, it is to be appreciated that 3D information may be determined in other manners in other embodiments.

In the instant illustration, the projector 106 projects a structured light pattern 302 onto the scene 202. In some implementations a sequence of different structured light patterns 302 may be used. In other implementations, other devices such as general room lighting may generate structured light patterns. A light fixture, bulb, and so forth may be configured such that emitted light contains one or more modulated structured light patterns 302. For example, two structured light patterns may be presented, each at a different non-visible wavelength within the structure of an incandescent bulb.

The cameras 108 used to detect the structured light may also be incorporated into bulbs or assemblies suitable for installation in existing light fixtures. These assemblies may be configured to communicate with the computing device 104 wirelessly or via transmission of a signal via the household electrical wiring. In some implementations, the assembly may provide pre-processing of input prior to sending data along to the computing device 104.

This structured light pattern 302 may be in wavelengths that are visible to the user, non-visible to the user, or a combination thereof. The structured light pattern 302 is shown in this example as a grid for ease of illustration and not as a limitation. In other implementations other patterns, such as bars, dots, pseudorandom noise, and so forth may be used. Pseudorandom Noise (PN) patterns are useful as structured light patterns because a particular point within the PN pattern may be specifically identified. A PN function is deterministic in that given a specific set of variables, a particular output is defined. This deterministic behavior allows for specific identification and placement of a point or block of pixels within the PN pattern. In some implementations, a plurality of structured light patterns 302 may be used to image the scene. These may include different PN patterns, geometric shapes, and so forth.

For illustrative purposes, a sphere 304 is shown positioned between the projector 106 and a wall in the scene 202. A shadow 306 from the sphere 304 appears on the wall. Inspection of the sphere 304 shows a deformation or distortion effect 308 of the structured light pattern 302 as it interacts with the curved surface of the sphere 304.

In some implementations other effects, such as dispersion of the structured light pattern 302, may be used to provide information on the topology of the scene. Where the projector 106 and camera 108 have differing fields of view, such as shown in FIG. 2, the dispersion or change in the "density" of the structured light pattern 302 may be used to determine depth of field.

The camera 108 detects the interaction of the structured light pattern 302 with objects within the scene. For example, the deformation effect 308 on the sphere 304 is detected by the camera 108. The camera may similarly identify deformation effects on users within the environment and may utilize this information to identify user gestures and how trajectories of these gestures. That is, the camera 108 may identify, via deformation in the structured light, a location of a selection tool (e.g., a user's finger) as this location changes over time. The ARFN 102 may then use these locations tracked over time to identify a trajectory of the gesture.

Detecting Hand Poses

Figure 4:
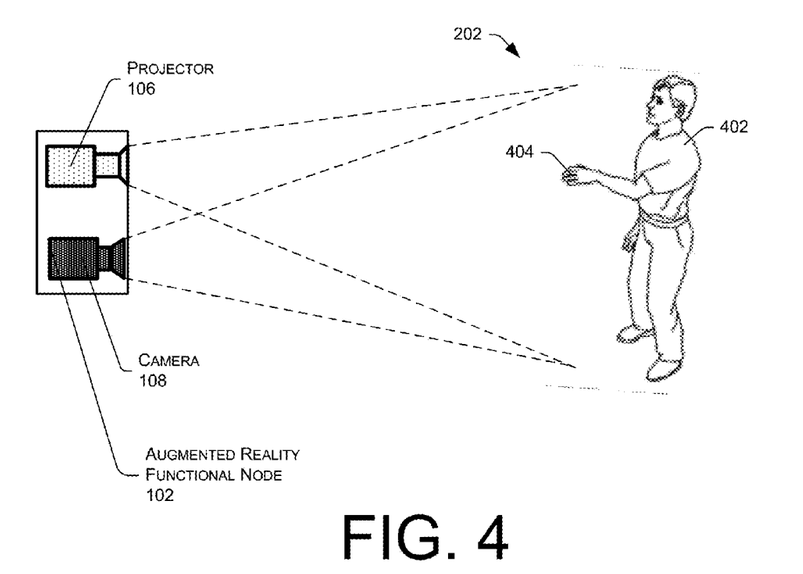
FIG. 4 is an illustrative diagram of the ARFN detecting an object, such as the user's hand, within an environment.

FIG. 4 illustrates an example of how the ARFN 102 may be used to observe and identify hand gestures within the scene 202. FIG. 4 shows a person 402 and the person's hand 404 as examples of objects within the environment 100 that may be analyzed by the ARFN 102.

In order to identify hand gestures, the ARFN 102 detects and tracks the hand 404 within the environment or scene 202. Specifically, the ARFN 102 may identify a sequence of hand positions or poses that form a hand gesture. A hand gesture may be defined by a series of poses of the hand 404, where each pose indicates the 3D position of the hand 404 and the 3D angular orientation of the hand 404. Position and angular orientation may be evaluated as absolute positions and orientations or as relative positions and orientations.

As an example, 3D position coordinates may be specified relative to orthogonal X, Y, and Z axes. 3D angular orientations may be specified as rotations about the X, Y, and Z axes.

As described above, the camera 108 may be used in conjunction with a structured light pattern projected by the projector 106 to capture 3D information regarding objects within the scene 202. Specifically, the projector 106 may project a structured light pattern onto the scene 202, and the camera 108 may capture a 2D image or array that indicates the resulting reflected light pattern, which is potentially distorted by objects within the scene 202. The reflected light pattern can be analyzed to reconstruct 3D characteristics or models of objects within the environment 100.

In addition to being used to observe a reflected light pattern, as described above, the camera 108 of the ARFN 102 may be used to capture 2D images of the scene 202. For example, the camera 108 may be used in conjunction with ambient lighting, with or without further illumination by the projector 106, to capture a 2D image of the environment 100.

The captured 2D image may be a color or grayscale image, comprising an array of pixels defined by tone or color intensities.

As described above, the projector 106 may be configured to project non-visible light, or light of a specific wavelength that can be filtered by the camera 108 or by electronics associated with the camera 108. This may allow the ARFN 102 to obtain, from a single image capture, a 2D color image of the scene 202 and a 2D pattern image of the projected light pattern as reflected by any objects within the scene 202, such as the person 402 and/or the person's hand 404.

Note that certain embodiments may implement 3D shape detection, analysis, and reconstruction using techniques that do not involve the projection and/or analysis of structured light. Accordingly, it should be understood that structured light analysis is described as but one example of various 3D analysis techniques that may be used to identify 3D shapes within a scene or within regions of a scene.

Object (e.g., Hand) Recognition

Described below are techniques of using a projection and imaging system (e.g., an ARFN 102) to recognize objects in a sequence of images, such as images showing a hand making gestures, when the objects may be partly occluded in some of the images. The various processes described below with reference to FIGS. 5 and 8 may be implemented by the architectures described herein, or by other architectures. Each process is illustrated as a collection of blocks in a logical flow graph. Some of the blocks represent operations that can be implemented in hardware, software, or a combination thereof. In the context of software, the blocks represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order or in parallel to implement the processes.

Figure 5:
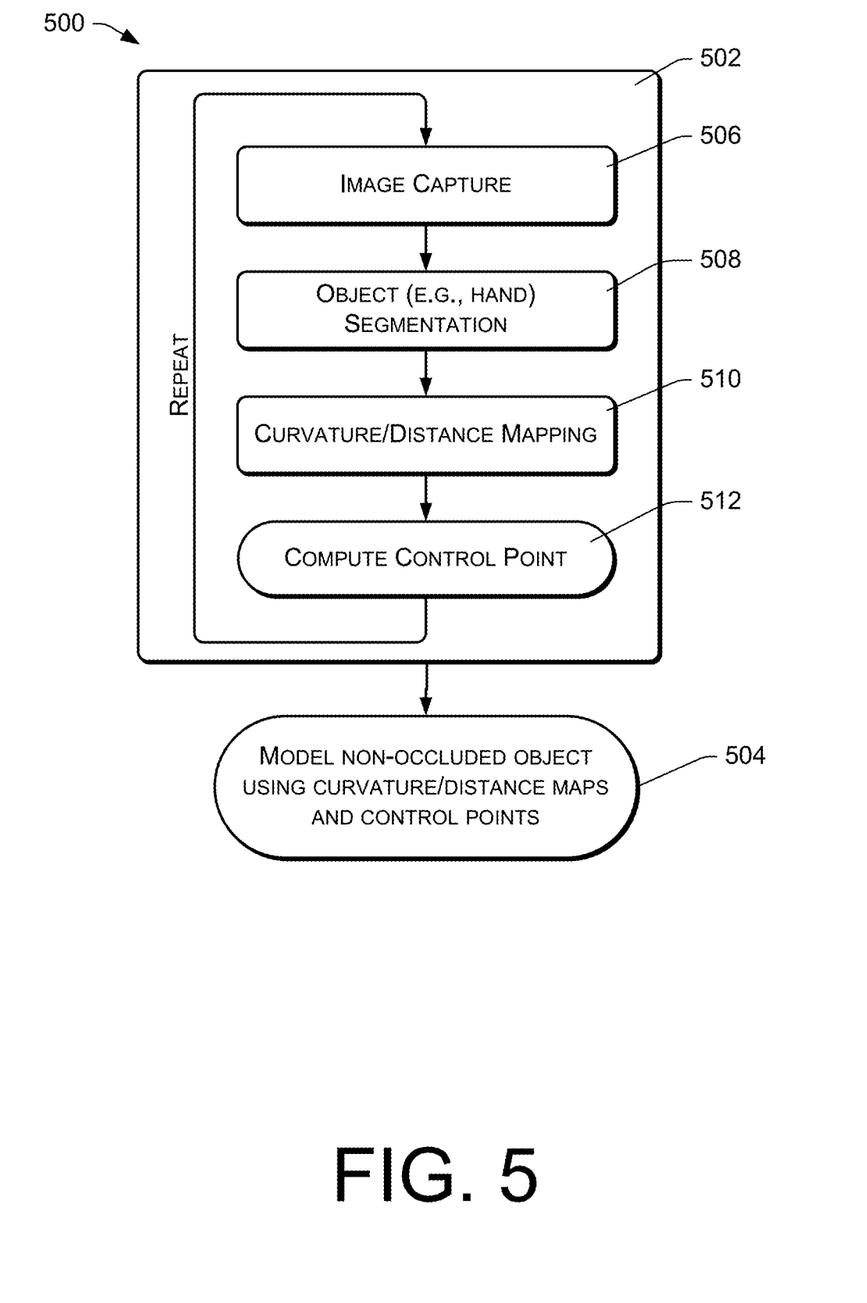
FIG. 5 illustrates an example flow diagram of an ARFN analyzing or monitoring a scene or environment to build a model of an object from two dimensional images that may be then used for recognizing the object in future images even if the object is partially occluded.

FIG. 5 illustrates an example process 500 of creating a model of an object, such as the hand 404, from two dimensional images taken within the scene 202 when the object is fully viewable. The model may then be used for recognizing the object in future images even if the object is partially occluded. Recognizing an object, and particularly a hand, is non-trivial, especially when part of the object is occluded by other parts of the hand or by other objects. The recognition techniques described below are invariant to translation, rotation, and scaling, and may be accomplished in real-time due the use of partially distorted two-dimensional (2D) contours in images, which reduce processing requirements.

The process 500 will be described as being performed in the environment described above with reference to FIGS. 1-4. However, the process 500 may be performed in other environments, using other means of image capture and/or scene analysis.

At 502, an iterative process is performed to capture and analyze a series of images of an object, such as a hand, taken from the scene 202, thereby generating a model of a non-occluded object 504. Several actions within action 502 are performed repetitively, with respect to subsequent images or frames corresponding to successive instances in time. Generally, the action 502 comprises capturing a sequence of images showing an object in motion, such as a hand of a user making a gesture, and using the images to compute a model for subsequent object recognition.

Each repetition of the action 502 more specifically comprises an action 506 of capturing one or more images of the scene 202, including those parts or regions of the scene 202 that may contain an object, such as the hand 404. In the described embodiment, the one or more images may be 2D images captured by the camera 108. The one or more images may also include other data objects, such as images containing 3D information corresponding to the scene 202. For example, certain captured images may show a reflected light pattern, based on a structured light pattern that is projected by the projector 106. Three dimensional information or characteristics regarding the scene may be obtained by analyzing the reflected light pattern.

Alternatively, or in addition, the captured images may include images of the scene 202 taken from different perspectives, which may be analyzed in comparison to each other to reconstruct 3D characteristics of the scene 202.

An action 508 may comprise segmenting the object, such as the hand 404 captured in the image taken from the scene 202. Object segmentation involves performing various types of shape analysis, including 2D and/or 3D techniques, to identify the object, such as the hand 404, within the scene 202.

An action 510 involves application of curvature and distance mapping to represent the objects in the images captured from the scene. Generally, points along a periphery of the object in each image are translated into a map of the object's curvature and a map of distances between the points. Representative examples of action 510 involving mapping an open and a partially occluded hand are described below in more detail with reference to FIGS. 6A-6C and 7.

An action 512 includes computing control points associated with the object. The number and position of control points may vary for different objects. For the human hand, for example, the control points include distinctive points such as tips of fingers, mid-points along each side of the fingers, valley points between fingers, and so forth.

The actions 506-5112 can be repeated for as many images as desired to form the model 504. The resulting model 504 may be expressed in terms of the curvature map, distance map, and control points.

FIGS. 6A-6C and 7 illustrate how the curvature and distance mappings of action 510 are performed to aid in recognition of an object, such as a hand, regardless of whether the object is fully observable or partially occluded.

Figure 6A:
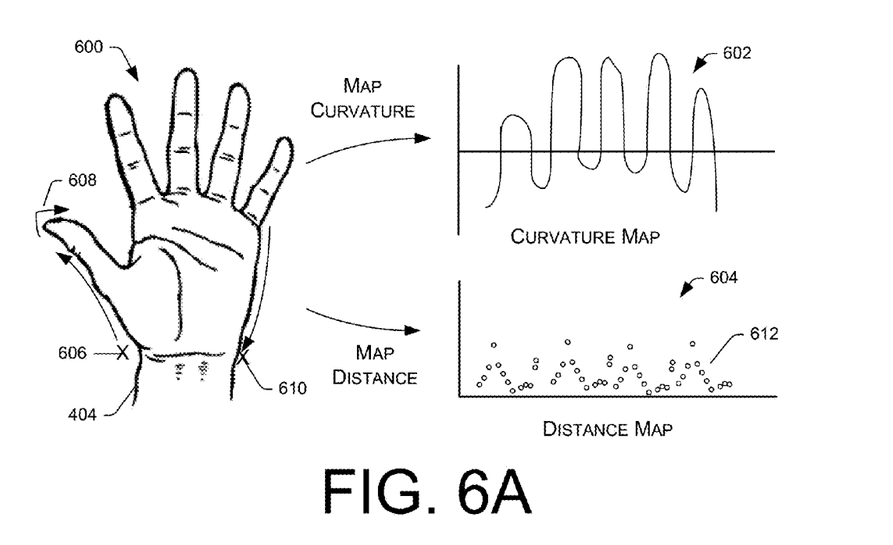
FIG. 6A-6C illustrate an example technique for recognizing an object, such as a hand, in a different images of the environment is the same object, even when the object is fully observable in one image and partially occluded in another image.

FIG. 6A shows a 2D image 600 of the human hand 404 in a fully observable, non-occluded state. In this view, the hand 404 is open with all five fingers independently distinguishable. The 2D image of the hand is mapped into two plots: a first or curvature map 602 and a second or distance map 604. The curvature map 602 is formed by mapping the curvature of the hand 404 in terms of a predefined translation function associated with the curvature. The outer periphery line of the 2D hand image 600 may be traced beginning at a point 606 at the base of the palm, around each of the fingers (as represented by the arrows 608), and terminating at a point 610 at the base of the palm on the opposite side.

The translation function may be essentially any rule that graphically captures curvature of the hand in the 2D image. For example, one function may be to express the contour in terms of direction changes along the hand where leftward movement is positive on the curvature map 602 and rightward movement is negative. Another example function may be to express in terms of vertical direction so that upper movement is positive on the curvature map 602 and downward movement is negative. Essentially any translation function may be used, so long as the function is consistently applied across the 2D images of the objects, or hands.

The distance map 604 is formed as a function of distance along the curvature of the hand image 600. One approach to plotting the distance is to express the points 612 in the distance map 604 as an absolute value of the distance between points along the curvature. Accordingly, the distances between points along the lengths of the fingers tend to be greater in comparison to the distances between points along the finger tips and valleys. Said another way, points on transitions between positive and negative portions of the curvature map tend to be closer together than points between the positive and negative transitions.

The curvature map 602 and the distance maps 604 are used together to aid in recognizing objects, such as hands, in captured images as being the same, even though the objects may be partially occluded in some images. The distance map 604 is used to account for scaling differences. For instance, the same hand may be captured at different depths in various images of the scene. The same hand may therefore exhibit different sizes in the 2D images, although it is desirable to recognize that they are indeed the same hand. The distance map 604 allows the two different images to be adjusted for this scaling difference, so that size is removed as a factor in the recognition process. The curvature map 602 is then used in comparisons of objects. The maps will not be identical, since part of the observed hand is occluded, but the maps will resemble one another in parts where both objects are visible and not occluded. If the comparison results exceed an acceptable threshold, the partially occluded hand is deemed to match the hand model. This is described in more detail with continuing discussion of FIGS. 6B, 6C, and 7.

Figure 6B:
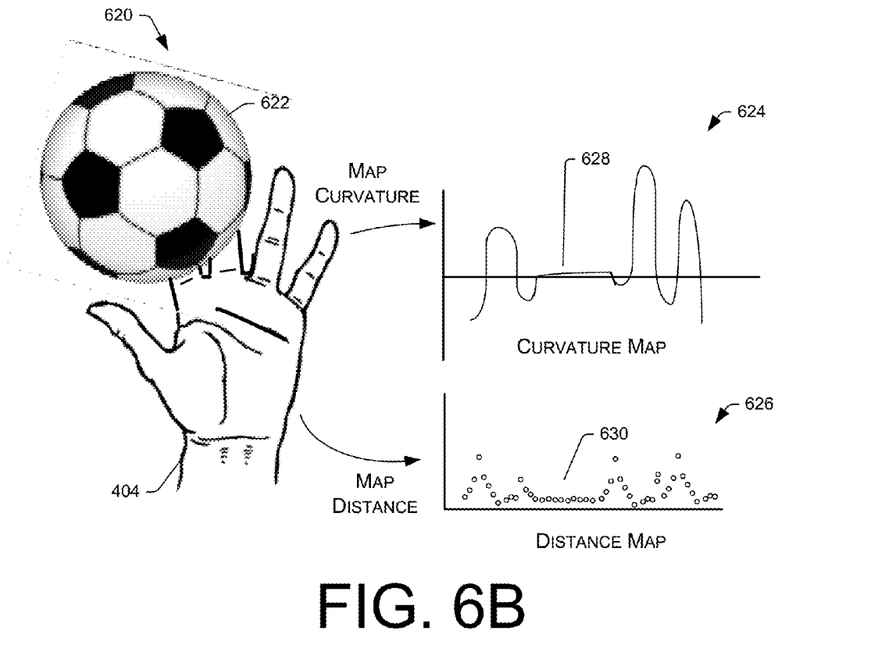

FIG. 6B shows a 2D image 620 of the same human hand 404, but this time the hand is at least partially occluded by another object. In this illustration, a soccer ball 622 is blocking two fingers of the human hand 404 so that those fingers are not visible in the image 620. The 2D image 620 is likewise mapped into two plots: a first or curvature map 624 and a second or distance map 626. The curvature map 624 is formed by mapping the curvature of the hand 404 in terms of the same predefined translation function associated with the curvature that was used in the mapping of the non-occluded hand in FIG. 6A. The outer contour line of the 2D hand image 620 may be traced beginning at a point at the base of the palm, around each of the fingers (as represented by the arrows), around the ball 622, and terminating at a point at the base of the palm on the opposite side. Notice that the resulting curvature map 624 has a flat portion 628 associated with the outline of the soccer ball 622 in the image 620. The curvature of a circle translates to a small constant value.

The distance map 626 is formed as a function of distance along the curvature of the hand image 620. The distances tend to be fairly constant along the smooth curvature of ball, producing a flat portion 630 between the peak and valley portions of the plot 626.

Figure 6C:
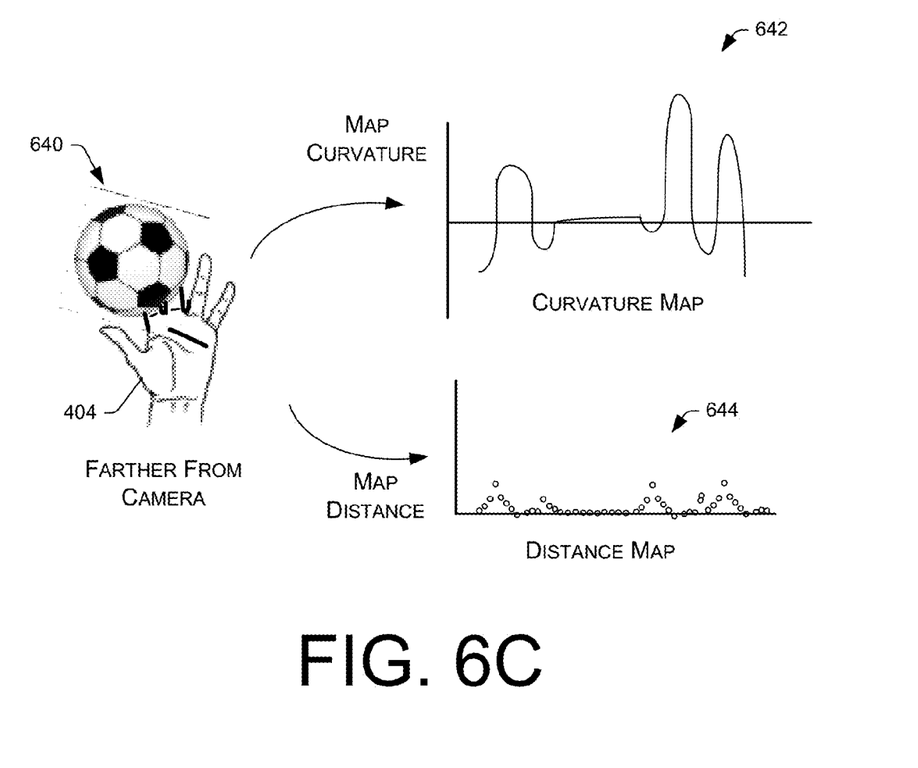

FIG. 6C shows a 2D image 640 of the same human hand 404, with a similar partial occlusion caused by the soccer ball 622 as in FIG. 6B. This figure differs, however, in that the image 640 of FIG. 6C is smaller in scale than the image 620 of FIG. 6B. The 2D image 640 is mapped into two plots as described before, including a curvature map 642 and a distance map 644. The curvature map 642 essentially resembles that of the curvature map 624 of FIG. 6B, as the contour of the hand and ball are roughly identical in this example. However, the distance map 644 is different from the distance map 626 of FIG. 6B in that the amplitudes of the curve is different to account the difference in scale. These differences are used by the system to account for variations in depth of the same objection moving through space, but being captured in 2D images. As a result, the depth variable may be removed or otherwise accounted for during the analysis of deciding whether the partially occluded object (e.g., hand) is essentially the same as the fully viewable object.

Figure 7:
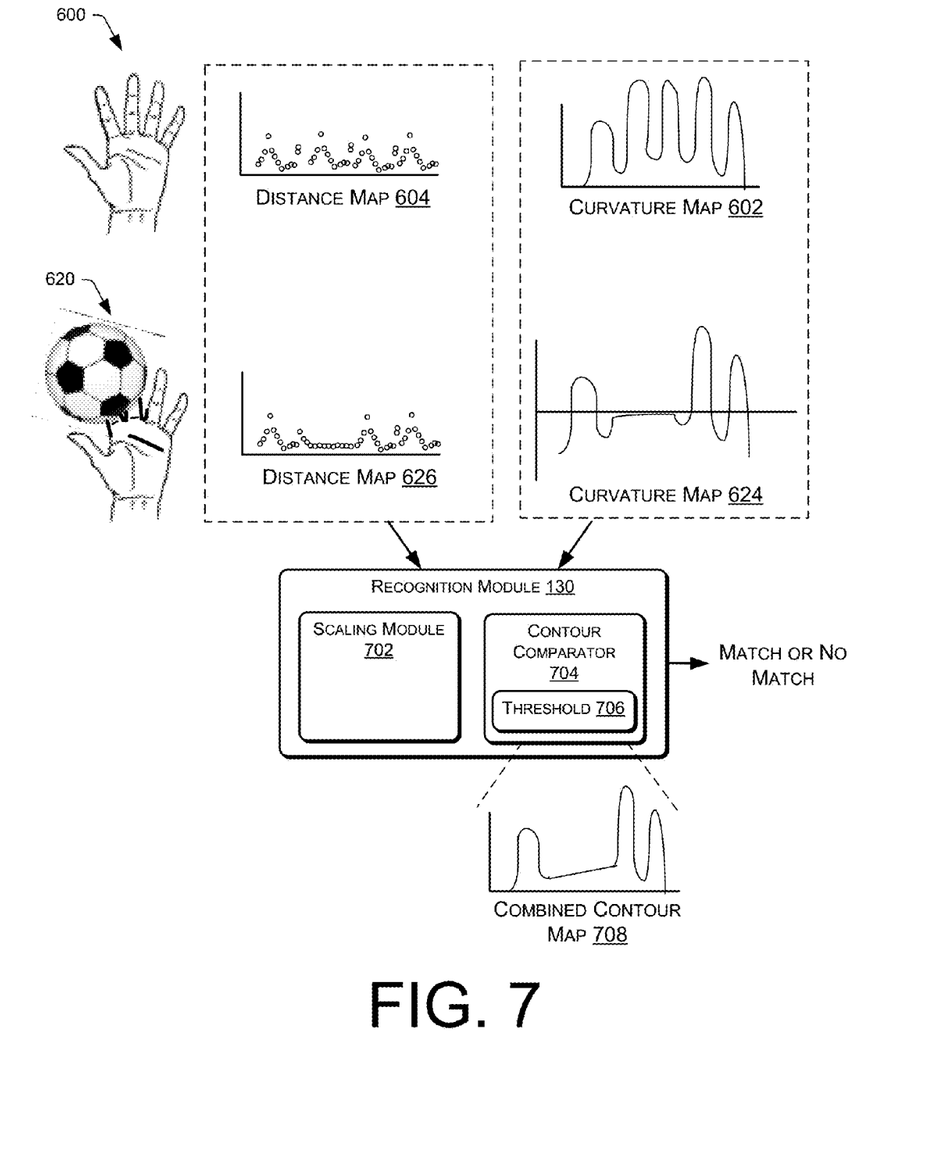
FIG. 7 shows how the recognition technique of FIGS. 7A-7C is able to identify a partially occluded object as similar to, or the same as, an object that is fully observable.

FIG. 7 illustrates how the recognition module 130 uses the contour and distance maps of the 2D images to determine whether the objects (e.g., hands) are the same. The recognition module 130 includes a scaling module 702 to normalize or otherwise remove size differences caused by depth concerns from the two different images. The distance maps 604 and 626 are passed to the recognition module 130, and the scaling module 702 uses the points to evaluate whether the patterns are roughly the same, but for differences in amplitudes. Once the depth variable is normalized, the curvature maps 702 and 724 are used to determine whether the two objects are the same.

The recognition module 130 also has a contour comparator module 704 to compare the two curvature maps 602 and 624 generated from two different images. The contour comparator 704 evaluates the commonality of the two curvature maps and determines whether there is sufficient commonality to exceed a threshold level 706 to deem the maps as generally the same, but for some differences caused by the occluded portion of the image. In the illustrated example, the two curvature maps 602 and 624 have three curve portions that are roughly similar (two on the right, and one on the left), and a mid section that is not. A combined curvature map 808 represents what parts of the two curvature maps seem to resemble one another.

For discussion purposes, suppose the threshold 706 is set to a 60% similarity metric. If the three curves represent roughly 60% of the total of five curves seen in the curvature map 602 representing the unobstructed image 600, then the two images are said to contain the same object, or hand in this case. Conversely, if the similarities between the two curvature maps are insufficient to exceed the threshold 706, then the objects in the two images are deemed to be different.

The threshold 706 is configurable or tunable as desired to allow greater or lesser flexibility in identifying two objects as the same, even when one is partially occluded.

Figure 8:
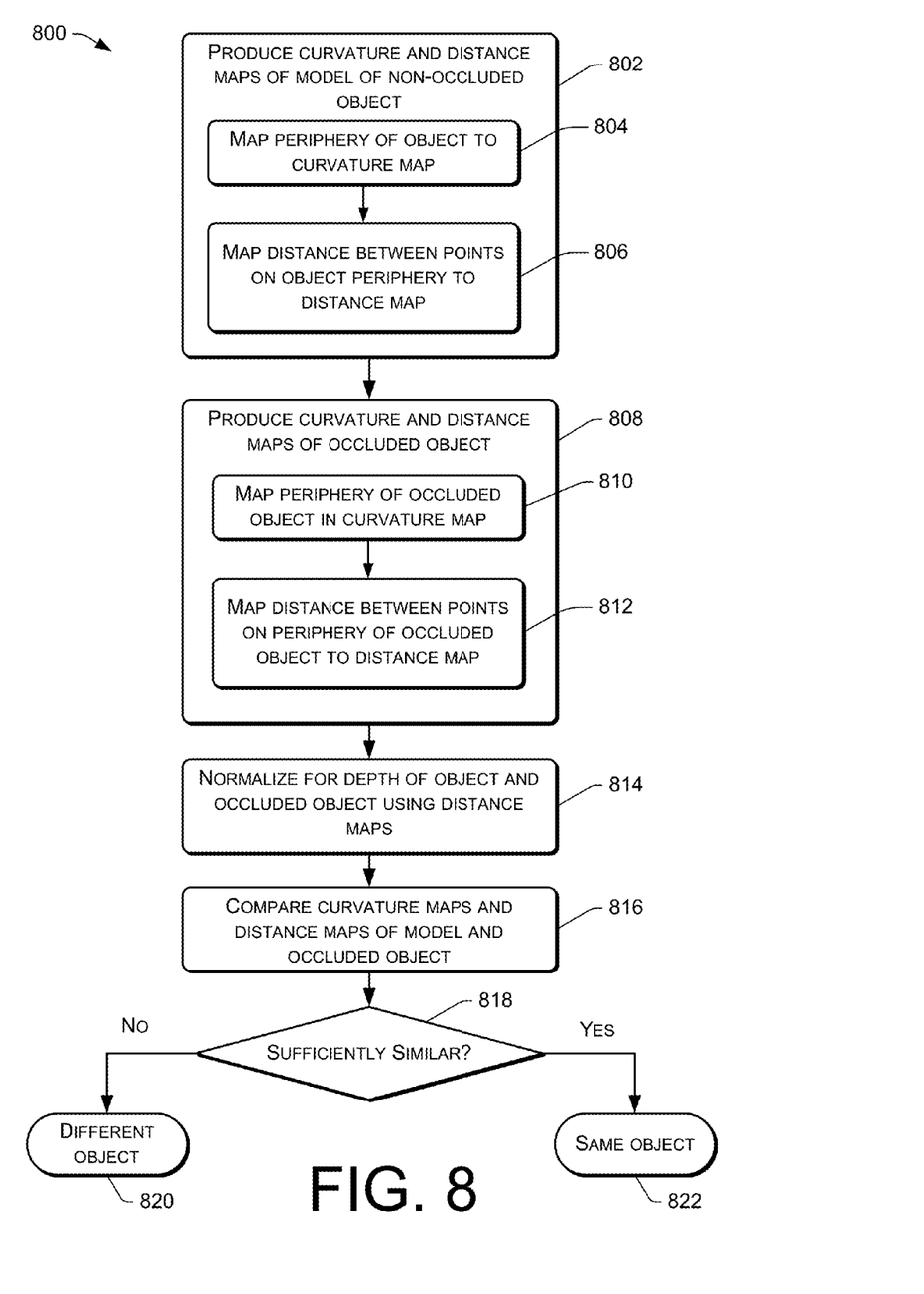
FIG. 8 shows an example flow diagram for recognizing an object, such as a hand, when partially occluded.

FIG. 8 illustrates an example process 800 for recognizing an object, such as a hand, when partially occluded. The process 800 will be described as being performed in the environment described above, but may be performed in other environments, using other means of image capture and/or scene analysis.

At 802, contour and distance maps of the model of a non-occluded object are produced from a 2D image of an environment within which the object resides. This act 802 involves tracing the periphery of the object to produce a curvature map at 804. As shown in FIG. 6A, for example, the image 600 of the fully observable human hand 404 may be translated into the curvature map 602 by tracing the outer perimeter of the hand in the image and translating that into points in the curvature map 602. Additionally, at 806, distances between points on the contour of the object are mapped to a distance map. Again, as shown in FIG. 6A, the distances between points along the periphery of the hand in the image 600 are plotted to form the distance map 604.

At 808, contour and distance maps of an occluded object are produced from another 2D image of an environment within which the object resides. This involves a first action 810 of tracing the contour of the partially occluded object to produce a curvature map. As shown in FIG. 6B, for example, the image 620 of the human hand 404 when partially occluded by a soccer ball may be translated into the curvature map 624 by tracing the outer perimeter of the hand and ball in the image and translating that into points in the curvature map 624. At 812, distances between points on the periphery of the partially occluded object are mapped to a distance map. Again, as shown in FIG. 6A, the distances between points along the periphery of the hand and soccer ball in the image 620 are plotted to form the distance map 626.

At 814, any variation of images caused by depth differences is normalized or otherwise adjusted through use of the distance maps. As explained above with respect to FIG. 6C, the distance maps may be used to account for variations in depth of the object as captured in the 2D images. For instance, the size of a hand of a child can be smaller and the size of a hand of an adult can be larger. However, the process is designed to enable recognition of the different sized hands from a non-occluded hand model and a particular occluded user hand.

At 816, the curvature maps and distance maps of the object and partially occluded objects are compared. As discussed above with reference to FIG. 8, for instance, the recognition module 130 may employ a comparator 704 that finds similarities in shapes among the curvature maps and distance maps.

At 818, the process 800 determines whether the curvature maps of the two objects (of which one is partly occluded) are sufficiently similar to be deemed the same type of object. In one implementation, the results of the comparator 804 are measured against a threshold, and if the threshold is achieved, the two curvature maps are deemed sufficiently similar at 818. If they are not sufficiently similar (i.e., the "no" branch from 818), the objects are determined to be different from one another at 820. Conversely, if the two objects from the two images are sufficiently similar (i.e., the "yes" branch from 818), the objects are determined to be the same at 822.

CONCLUSION

Although the subject matter has been described in language specific to structural features, it is to be understood that the subject matter defined in the appended claims is not necessarily limited to the specific features described. Rather, the specific features are disclosed as illustrative forms of implementing the claims.

What is claimed is:

1. A system comprising:
   one or more processors;
   one or more cameras to capture at least a first image and a second image of an environment, the first image showing at least in part a hand that is not occluded from the one or more cameras and the second image showing at least in part the hand that is at least partly occluded from the one or more cameras;
   one or more non-transitory computer-readable media storing computer-executable instructions that, when executed by the one or more processors, cause the one or more processors to perform acts comprising:
   producing a first curvature map to represent a curvature of the hand represented in the first image;
   generating a first distance map using distances between points on the first curvature map, wherein the first distance map includes a first distance between a first point on the first curvature map and a second point on the first curvature map and a second distance between the second point on the first curvature map and a third point on the first curvature map;
   producing a second curvature map to represent a curvature of the hand represented in the second image;
   generating a second distance map using distances between points on the second curvature map, wherein the second distance map includes a third distance between a first point on the second curvature map and a second point on the second curvature map and a fourth distance between the second point on the second curvature map and a third point on the second curvature map;
   generating a first adjusted curvature map and a second adjusted curvature map to account for depth variation based at least in part on the first distance map and the second distance map so that the first adjusted curvature map and the second adjusted curvature map represent the hand represented in the first image is at approximately a same distance from the one or more cameras as the hand represented in the second image;
   comparing the first adjusted curvature map to the second adjusted curvature map; and
   determining that the hand represented in the first image is the hand represented in the second image based at least in part on results obtained from comparing the first adjusted curvature map to the second adjusted curvature map.

2. The system of claim 1, wherein the hand represented in the second image is at least partly occluded in that not all fingers of the hand are observable by the one or more cameras.

3. The system of claim 1, wherein determining that the hand represented in the first image is the hand represented in the second image includes determining that similarities between the first adjusted curvature map and the second adjusted curvature map exceed a threshold value.

4. The system of claim 1, further comprising a projector that projects a pattern into the environment, wherein the camera captures the first image and the second image based at least in part on analyzing a reflection of the pattern.

5. A system comprising:
   a camera to capture images of an object within an environment, wherein a first image represents at least in part the object in a non-obscured state and a second image represents at least in part the object in an at least partly occluded state; and
   a computing device configured to:
   generate a first curvature map associated with a curvature of the object represented in the first image;
   generate a second curvature map associated with a curvature of the object represented in the second image; and
   determine that the object represented in the first image is the object represented in the second image based, at least in part, on an analysis of the first curvature map and the second curvature map, wherein the analysis includes to determine that a first distance between a first point and a second point on the first curvature map is associated with a second distance between a third point and a fourth point on the second curvature map.

6. The system of claim 5, wherein a generate the first curvature map comprises to translate first points along a periphery of the object represented in the first image into a set of values as a function of directional movement along the first points.

7. The system of claim 5, wherein the analysis of the first curvature map and the second curvature map comprises to analyze the first curvature map and the second mapped curvature to ascertain a similarity value and to evaluate that the similarity value exceeds a predefined threshold.

8. The system of claim 5, further comprising a projector that projects a pattern into the environment and onto the object, wherein the camera captures the first image and the second image based at least in part on analyzing a reflection of the pattern.

9. The system of claim 5, wherein the object comprises at least a portion of a hand.

10. One or more non-transitory computer-readable media storing computer-executable instructions that, when executed by one or more processors, cause the one or more processors to perform acts comprising:
   producing a first curvature map associated with a first periphery of an object represented in a first image;
   generating a first distance map using distances between points on the first periphery of the object represented in the first image, wherein the first distance map includes a first distance between a first point on the first curvature map and a second point on the first curvature map and a second distance between the second point on the first curvature map and a third point on the first curvature map;
   producing a second curvature map associated with a second periphery of the object represented in a second image;
   generating a second distance map using distances between points on the second periphery of the object represented in the second image, wherein the second distance map includes a first distance between a first point on the second curvature map and a second point on the second curvature map and a second distance between the second point on the second curvature map and a third point on the second curvature map; and
   determining that the object represented in the first image is the object captured in the second image based at least in part on an analysis of the first curvature map and the second curvature map.

11. The one or more non-transitory computer-readable media of claim 10, wherein the object represented in the second image is at least partly occluded by another object.

12. The one or more non-transitory computer-readable media of claim 10, wherein the object represented in the first image is at least a portion of a hand and the object represented in the second image is at least a portion of the hand that is at least partly occluded.

13. The one or more non-transitory computer-readable media of claim 10, wherein determining that the object represented in the first image is the second object represented in the second image includes evaluating that similarities between the first curvature map and the second curvature map exceed a threshold value.

14. The one or more non-transitory computer-readable media of claim 10, further instructions that, when executed by one or more processors, cause the one or more processors to perform acts comprising projecting a pattern into environment, and capturing the first image and the second image based at least in part on analyzing a reflection of the pattern.

15. A method comprising:
   producing a first curvature map from points on a periphery of an object represented in a first image captured from an environment;
   producing a second curvature map from points on a periphery of the object represented in a second image captured from the environment, wherein the object is at least partly occluded in the second image; and
   evaluating similarity of the first curvature map and the second curvature map to determine that the object represented in the first image is the object represented in the second image based at least in part on a determination that a first distance between a first point and a second point on the first curvature map is similar to a second distance between a third point and a fourth point on the second curvature map.

16. The method of claim 15, wherein the object comprises at least a portion of a hand.

17. The method of claim 15, wherein evaluating similarity comprises measuring a similarity metric derived from analyzing the first curvature map and the second curvature map against a threshold value.

* * * * *